March 4, 1930.  E. W. SNYDER  1,749,046
POWER TRANSMISSION BELT
Filed Feb. 15, 1928
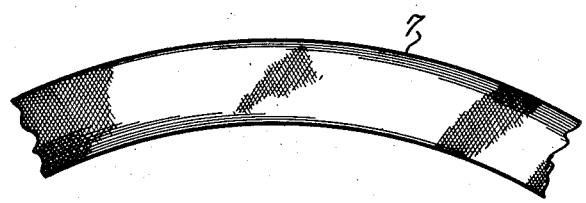
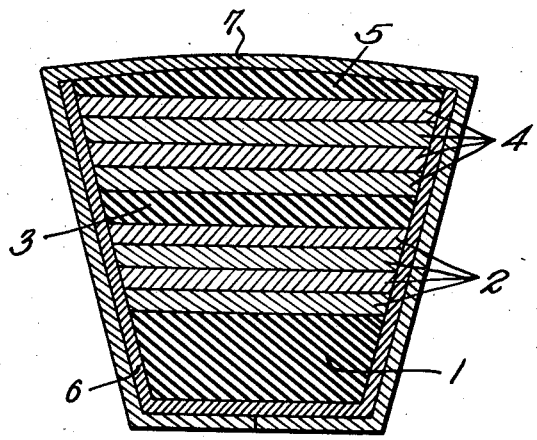

Patented Mar. 4, 1930

1,749,046

UNITED STATES PATENT OFFICE

EDGAR W. SNYDER, OF PHILADELPHIA, PENNSYLVANIA, ASSIGNOR TO L. H. GILMER CO., OF PHILADELPHIA, PENNSYLVANIA, A CORPORATION OF NEW JERSEY

POWER-TRANSMISSION BELT

Application filed February 15, 1928. Serial No. 254,407.

The object of my invention is to provide a power transmission belt of such construction that it may stretch, within certain limits, thereby avoiding the breaking of the belt on its upper face.

Another object of my invention is to provide the belt with a reinforce in its neutral axis.

Another object of my invention is to provide a V-belt with a cover providing friction side and bottom faces; and with these and other objects in view, my invention consists of the parts and combination of parts as will be hereinafter pointed out.

In the drawings:

Figure 1 is a side elevation of a section cut from my improved belt.

Figure 2 is a transverse vertical section through my improved belt, drawn on a larger scale than Figure 1.

The reference numeral 1 designates a layer of rubber, upon which I place, preferably, four layers of textile fabric 2, cut with the warp of the fabric, which constitute a reinforce in the neutral axis of the belt; rubber is frictioned in each of these layers 2, in a well known manner. In the claim, for sake of brevity, I will refer to these four layers as a layer, and the rubber content of these layers 2 will be understood to be included in the claim.

On the reinforce layers 2 I place a layer of rubber 3, and on top of this rubber layer 3 I place, preferably, four layers of open weave textile fabric 4 cut on the bias, rubber being frictioned into one face of each layer and coated on the other face. This is accomplished by passing the rubberized fabric between the rolls of a calender machine, in which one roll makes two and one half revolutions to one revolution of the other roll, whereby the fabric is skin coated with rubber on one face and the rubber frictioned into the other face. By cutting these layers on the bias I provide, within certain limits, for the stretching of the belt without, in any manner, weakening the belt, and I obviate the danger of the breaking of the top face of the belt, or of the fabric at the outer face of the belt. When, as in the old practice, the fabric cut was on the warp and used in this zone of the belt there was no stretch permitted in the belt without breaking the fabric when tension was placed on the belt, and it was not uncommon for such belts to break like a pipe stem. In the claim these plies 4 will be included in the word "layer", and it will also be understood in the claim that the rubber is frictioned into these layers. On these layers 4 I place a comparatively thin layer of rubber 5.

The sides and bottom of this structure are then covered with a binder fabric 6 in both faces of which rubber has been frictioned.

A covering 7 is then wrapped around the structure of layers and binder. Rubber is frictioned in both sides of this cover after which one side is skinned in the same manner as has heretofore been explained in connection with the layers 4. In order to firmly anchor the cover or jacket at the top of the belt I employ the rubber layer 5 which cements the cover at that point with the layer 4.

After the belt is thus formed it is passed through forming rolls to mould it into a substantially V-shape. Then the belt is carefully placed on a roll, is temporarily covered by a suitable fabric and then placed in a vulcanizing chamber, from which it is taken at the proper time and the temporary cover removed, leaving the belt in its V-shape ready for the market.

My improved belt has been found in actual commercial use to be very efficient.

What I claim is:

A V driving belt including a layer of rubber at its inner circumference, a reinforce layer, superposed on the rubber layer, a cushion layer superposed on the reinforce layer, a rubberized layer of open weave fabric cut on the bias superposed on the cushion layer and a rubber layer on the outer circumference, a covering enclosing said layers on three sides, and an outer covering completely enveloping the whole.

In testimony whereof I affix my signature.

EDGAR W. SNYDER.